(12) United States Patent
Le

(10) Patent No.: US 7,973,508 B2
(45) Date of Patent: Jul. 5, 2011

(54) AUTOMATION SYSTEMS DIAGNOSTICS AND PREDICTIVE FAILURE DETECTION

(75) Inventor: Canh Le, San Jose, CA (US)

(73) Assignee: XyZ Automation Inc., San Jose, CA (US)

( * ) Notice: Subject to any disclaimer, the term of this patent is extended or adjusted under 35 U.S.C. 154(b) by 355 days.

(21) Appl. No.: 12/001,151

(22) Filed: Dec. 10, 2007

(65) Prior Publication Data
US 2009/0146601 A1  Jun. 11, 2009

(51) Int. Cl.
*G05B 11/01* (2006.01)
(52) U.S. Cl. .................... 318/560; 318/568.16
(58) Field of Classification Search ............ 318/560, 318/565, 568.11, 568.16, 568.21, 568.22
See application file for complete search history.

(56) References Cited

U.S. PATENT DOCUMENTS

| | | | | |
|---|---|---|---|---|
| 4,980,625 | A * | 12/1990 | Shimada | 318/568.1 |
| 5,155,423 | A * | 10/1992 | Karlen et al. | 318/568.11 |
| 5,528,955 | A * | 6/1996 | Hannaford et al. | 74/490.01 |
| 7,181,294 | B2 * | 2/2007 | Nihei et al. | 700/30 |

* cited by examiner

*Primary Examiner* — Rina I Duda

(57) ABSTRACT

The present invention discloses a system and method for monitoring and diagnosing a robot mechanism. This requires adding intelligence to the diagnostics by parameters of physical robot arm linkages respecting component relative rotation or load transfer; storing rotation or translation relationship parameters characteristic of resonant frequencies between at least one mechanical link; receiving servo motor signals; digitizing and storing servo known normal data time histories; performing a time domain to frequency domain transformation on signal to identify components which are out-of band limit pre-sets.

6 Claims, 5 Drawing Sheets

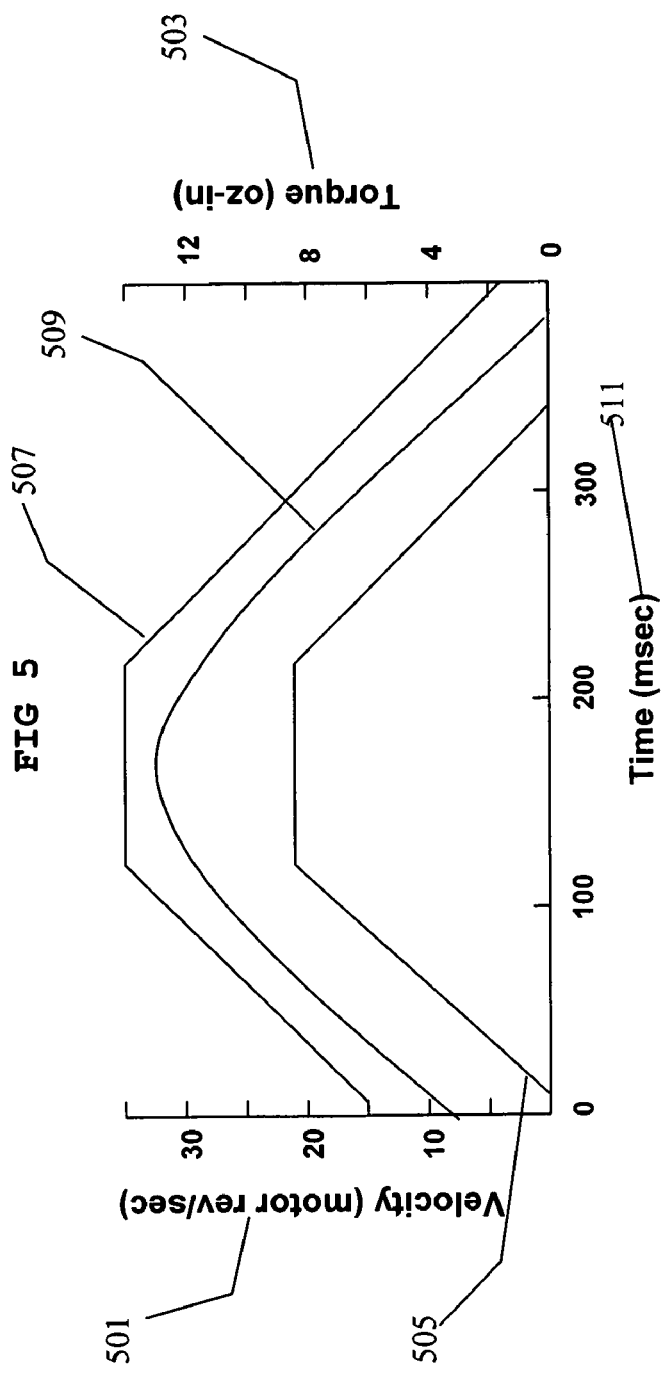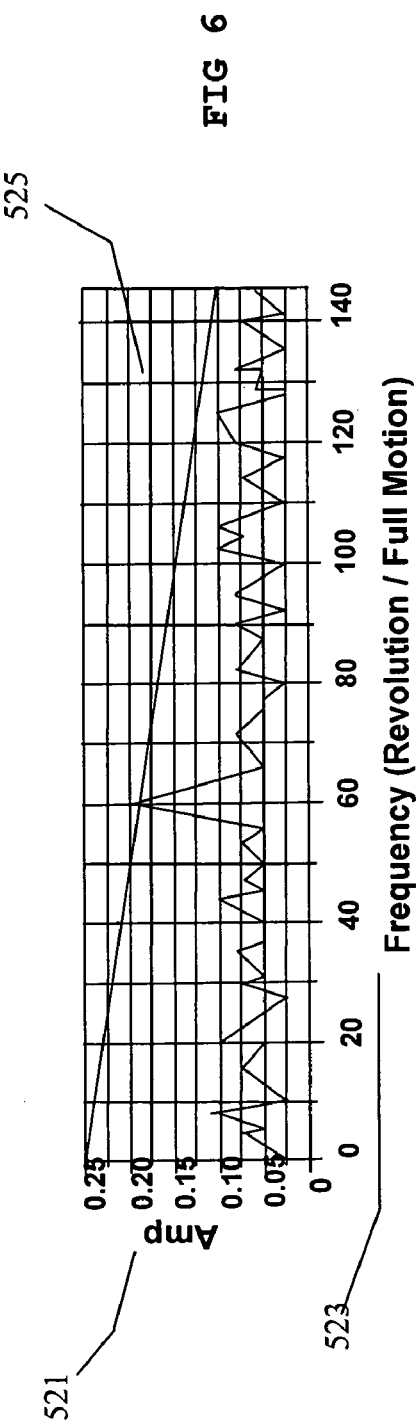

AUTOMATION SYSTEMS DIAGNOSTICS AND PREDICTIVE FAILURE DETECTION

BACKGROUND

Field of the Invention

The present invention generally relates to automation systems maintenance and specifically, to the monitoring and diagnostics of robot characteristics predictive of failures and methods to mitigate and prevent catastrophic line failures.

Assembly line stoppages in wafer-handling system IC processing significantly inhibit overall tool performance and reliability in manufacturing plants because failures in wafer-handling systems have significant mean time to repair (MTTR).

Based on some chipmaker data, more than 90% of failures were caused by improper placement of the wafer in the robot's end effectors, resulting in broken product wafers during transfer and handling. The problems were usually addressed by the replacement of wafer-handling components or manually recalibrating the handler. Overall, less than 10% of the root causes for failures are clearly identified. The problems are often incorrectly identified as failed system components, including motors, cabling, or the robot itself.

Studies indicate that a number of operands in the reliability equation can be increased with deployment of in situ diagnostic tools in wafer-handling systems, resulting in higher MTBF (mean productivity time between failures) and higher MCBF (mean cycles between failures), based on Semi E10-0701 guidelines.

Predictable Failure

Current robotic wafer-handling systems exhibit a binary behavior, functioning or down. Moreover, these same systems can successfully perform operations even while calibration and functionality of their critical wafer-handling devices are degrading, which leads to expensive consequences if nothing is done during this period to remedy the failing mechanism before catastrophic failure occurs to close the line. Since some relevant parameters are not monitored adequately, and the robotic systems approach critical failures, predictable failures occur, failures which can be mitigated or eliminated with appropriate timely action. What is needed are those monitoring parameters and timely mitigating actions.

Once a failure occurs, proper diagnosis and analysis frequently require the robot to be removed from the wafer-processing line and delivered to specially designed test fixtures located at the supplier's laboratory. A great deal of cost can be incurred moving the robot between the wafer fab and the supplier's lab. In situ analysis methods are needed, which monitor the performance on line and give warnings when components are degrading or failing. Thus monitoring and prediction are key to reducing costs. What is needed are ways to monitor degradation phenomena, and take measures to eliminate the natural course of consequences with machine vigilance and mitigation actions.

Automatic calibration methods have new found support in controller programmed servos in using references to position. High-resolution encoders provide feedback to the controller, indicating the position of each motor. Controller software continuously compares the actual motor feedback position to the software-commanded motor position to generate appropriate drive signals. The controller's integrated drives provide the necessary motor drive current. Through this tight integration, the controller has real-time knowledge of the velocity and torque of each motor. However, the position feedback can be improved, as there are still catastrophic system failures which are not caught by the current encoder feedback methods. Therefore physical position feedback is needed.

In the "touch calibration" mode, the controller commands a robot axis to slowly move the end effecter into the pre-defined nominal location for handoff of wafers in process tools. When the end effecter makes light contact, the axis slows down and the motor torque changes, indicating physical contact. The controller captures the encoder position as the calibration point. Since the controller is aware of the precise torque requirements of each motor, touch calibration is achieved with very low contact forces. Sophisticated torque-data processing algorithms are used to eliminate false triggers and ensure calibration consistency despite dynamic mechanical characteristics of the robot.

In situ automatic calibration also provides the foundation for additional reliability tools to monitor and diagnose the health of robotic systems while they are being used in manufacturing equipment. These new capabilities can be generally described as wafer-map tuning, calibration tracking, and mechanical-systems monitoring, precise tuned mapping and mechanical system integrity.

Calibration Approaches

In a series of steps, technicians can calibrate robot end effectors by using leveling tools, turning screws, and nudging robots into desired positions for wafer handling. One major semiconductor equipment OEM has estimated that highly skilled system technicians are only able to calibrate handlers to within 0.5 mm repeatability using manual methods.

A number of "auto-teach" methods have been deployed in recent years to improve upon manual teach methods, but many of these approaches cannot support full in situ diagnostics of handlers. One common auto-teach method uses a combination of specially designed fixtures and sensors placed in the wafer-handling station. In some systems, fixtures detect position using mapping lasers. Others use proximity sensors to detect the location of the end effector. While reducing the time it takes to teach wafer handlers, these approaches also require special fixtures for the end effectors and robots. Often, these special fixtures must be used when handlers are re-calibrated in the field. The use of sensors can also present additional reliability concerns as they require vigilance as well.

Touch-sensing calibration is use to evaluate mechanical integrity of handlers by monitoring the position, velocity, and torque of each motor in the system. However, handlers with mechanically damaged robots can give the false impression that systems are working properly if positions are detected and measured only by calibration sensors. Real-time access to motor torque and other system servo control data supports the ability to provide full in situ analysis of robot performance. What is needed are real-time implementations to detect proper positions to a finer scale.

Calibration Quality Tracking

While robot calibration may be successfully achieved when the robot is being set up, the quality of calibration during operation is rarely known. To be certain of continuous monitoring, the calibration sequence must be repeated. However, there is no certainty that the new calibration data is better than the original set-up data. What is needed are methods to calibrate and integrate the "drift" into the control mechanism to account drift for in situ without removal or robot removal for repair prematurely.

One solution is to compare incoming calibration data, collected by the controller, and the set-up baseline data while robots are operating. The calibration data is compared to the baseline and significant deviations are recognized as a critical change in the wafer-handling equipment. The equipment can be recalibrated with automatic routines, without special tools and with handler devices in situ. Trends in the change of calibration data are monitored as well. The abilities to monitor the repeatability of calibration and easily perform automatic calibration routines allow the system to maintain performance and wafer-handling. However, these methods only work within tolerances, and the robot will need to be repaired once the tolerances are exceeded. Methods are needed to correct for the drift and even integrate that into the controller motion program, such that drift is accounted for in a continuous fashion, not limited to pre-sets and boundaries of calibration positions.

Precisely Tuned Mapping

Robots typically utilize mapping lasers or through-beam sensors to determine the presence of wafers on each handling device and whether or not wafers are properly positioned. Untimely recognition of a wafer through-beam sensor can result in expensive failures due to the potential for damaging devices on substrates.

Establishing and maintaining proper mapping-system parameters require precision tuning. Wafers can vary in thickness and optical properties depending on the process steps being completed, as well as what type of products are being made. Generally, wafers must be mapped at two angles to ensure that they are properly detected in the correct locations and to enable detection of cross-slotted wafers.

A major factor in the incorrect mapping of wafers is an effect known as "keystoning." This occurs when the mapping scan and fan angles are incorrectly selected for the optical properties of the wafer-mapping device. By using an automated tuning algorithm to optimize mapping parameters, the keystoning effect is significantly reduced. During operation, mapping parameters are monitored and compared to baseline performance. Significant deviations are recognized and the user is alerted that mapping parameters may need to be retuned. The user can quickly diagnose the condition and optimize mapping parameters. Even with this procedure, failures occur. For any number of reasons, tolerances become small, phase shift angles stray to the 0° and 180° poles. Therein the feedback positional controls break down and the robot cannot not be stopped in time to prevent over shooting it target. Failures are expensive. What is needed are methods to read phase shift angles near the 0 and 180 poles, to catch out of sync control commands and retain failure prevention mechanisms. What are needed are more predictive failure mechanisms for stopping the assembly line before catastrophic system failures occur.

Mechanical Integrity

Other methods in situ tool monitor mechanical-system integrity. Wear in a robot's drive mechanism can go unnoticed, resulting in eventual and predictable critical failures. Wear is a normal occurrence in any mechanical device. Changes in lubrication or wear conditions also can alter the dynamic properties of wafer-handling actuators. Any change in the mechanical dynamics causes changes in the required energy to move robots, which is directly related to the torque, acceleration and velocity output of each motor for a given movement.

In some approaches, motor torque, velocity error, and position error are analyzed for minimum, maximum, mean, and standard deviation relative to baseline performance for an optimum mechanical system. Capturing this information while the robot is in situ enables preventive maintenance prior to system failure.

Following a move sequence, the data demonstrates that motion performance alone does not sufficiently inform the user about the mechanical integrity. Using an in situ method, a user gains knowledge of trends in the motor torque profile and can recognize mechanical deterioration long before a performance failure threshold is met. What are needed are automated implementation aware of these known degradation parameters, so that corrective measures are self initiated, automated, to predict failure and take commensurate counter measured response to stave off failure.

Servomotors are used extensively in robotic manipulators. The short story is that servo operation lags behind the command pulses. Their control is another area of where quicker response or even predictive response is mandatory to avert expensive consequences. Servomotors rotate according to command pulses, but there is a lag and the servo continues to move until the command pulses are exhausted. The feedback control loop includes an encoder which returns the number of command pulses received and output by the servo. If the command pulses returned by the encoder are smaller than the number output by the controller, the driver will try to rotate the servo more until the number is equal, number of pulses sent equals the number of pulse returned, ie the driver attempts to rotate the servomotor until the "deflection counter" is zero. This is not a problem unless the robot exceeds the position target, as the time lag between when the controller sends pulses and when the encoder writes back to the deflection counter, can be in some circumstances, received too late.

Quadrature output encoders are used extensively because they allow the determination of direction of rotation as well as incremental servomotor position. The encoder disks have signal generators which operate on out of phased pulse trains to inform controllers which direction the servo is turning and allow programming mechanism to use feedback to stop and reverse direction. The servo encoder is a type of pulse generator, which outputs three types of pulse signals, A/B phase signals. A phase and B phase are encoder pulse trains with the same cycle length phase shifted approximately 90%, with Z phase (index signal) pulse, generally once per revolution. What is needed are encoder implementations which provide feedback under even the phase change periods which are not served by the current encoder pulse train phasing. Furthermore, the digital counters for the A and B phase shift pulse channels operate reasonably well when the phase signals are plus or minus 90 degrees out of phase but are not guaranteed to function near the 0° and 180° phase shifts. There can be a 10°-20° phase shift spread centered around 0° and 180° whereby there is no error coverage. The controller circuitry cannot accurately count pulses near the 0 v and 5 v range. Therefore if the error occurs near the 0° and 180° phase shift angles, the stop signal will not handle the error timely and a failure can occur. What is needed is a way to catch servo phase shift channels signals even when polar phase shift angles occur.

In many robotic control mechanisms, the servo drives one or more belt drives or pulleys which extend the mechanical arm mechanism of the servo. Thus, even where the processor deflection counter is set to zero to stop the motor, the arm continues for a number of pulses. Although this dead movement by the servo may be small, the pulley multiplication factors amplify the total extension out from the servo, effectively multiplying the error from feedback lag.

Servomotor operation can be controlled by voltage, usually the default, velocity, position or in torque operation modes. Feedback is received in voltage, position, velocity, torque or current. Parameter relationships are usually well established. However, the occurrence of failures implies that perhaps only the major parameter relationships have been established What are needed are methods and devices which can continuously monitor important parameters in real-time, identifying and distinguishing the important characteristics and warning only when normal working bands are exceeded, foretelling of component failure, so that downtime can be avoided through preventive maintenance or work-a-rounds can be developed or catastrophic failure averted. While fail safe positions are designed for, infrequently these fail, and catastrophic results occur. What is needed are methods to monitor and prevent failures which would occur in the general course of servomotor use in robot systems.

SUMMARY

The present invention discloses a system and method for monitoring and diagnosing a robot mechanism. An aspect of the invention applies intelligence of physical robot arm linkage parameters respecting component relative rotation or load transfer; storing rotation or translation relationship parameters characteristic of resonant frequencies between at least one mechanical link; receiving servo motor signals; digitizing and storing servo known baseline data time histories; performing transformation from a time domain to a frequency domain on signal to obtain normal base signal continuously monitoring servo signal for pre-set action triggers.

Monitoring continues in real-time loop, receiving and digitizing known datum servo signals, obtaining signal frequency content from a time-frequency domain transform on monitored signal, determining if any received signal frequencies exceeded out-of-band margins, matching found out-of-band frequencies to any stored physical parameter characteristic frequencies, and notifying executive of any found matches. The mechanical mechanisms having resonant frequencies based on physical characteristics in the robot components affecting current, voltage, position or torque signal are used by signal processing using the resonance frequencies to identify location of mechanical load increases.

BRIEF DESCRIPTION OF DRAWINGS

Specific embodiments of the invention will be described in detail with reference to the following figures.

FIG. 5 is typical time history plots showing the difference between the new and the worn robot component.

FIG. 6 is a transformed frequency domain plot showing location of worn components.

DETAILED DESCRIPTION

In the following detailed description of embodiments of the invention, numerous specific details are set forth in order to provide a more thorough understanding of the invention. However, it will be apparent to one of ordinary skills in the art that the invention may be practiced without these specific details. In other instances, well-known features have not been described in detail to avoid unnecessarily complicating the description.

OBJECTS AND ADVANTAGES

The present invention discloses failure predictive Monitoring and Analysis of A) a robot servo with associated multiple components system, B) Phase Shift in Servo Encoder Feedback near 0° and 180° phase shift angles and C) Servo Current/Voltage Drawn under Load Time Domain and Frequency Domain profiling, Accordingly, it is an object of the present invention to provide more efficient and intelligent diagnostics for monitoring a robot mechanism having known physical attributes producing unique characteristic signatures, aiding in problem isolation and analysis in real-time.

It is an object of the present invention to install hardware and software to make automated judgments as to corrective actions, as well as executing them in real-time.

It is another object of the present invention to provide embodiments designed for monitoring servo current, voltage, and torque or motion profiles for healthy signatures which are stored in electronic medium for real-time comparison, signaling out-of-band or set limits where and when they occur in real-time.

It is another object of the present invention to provide methods to terminate manipulator motion when phase shift angles are out of specified band limits.

EMBODIMENTS OF THE INVENTION

Figure 1:
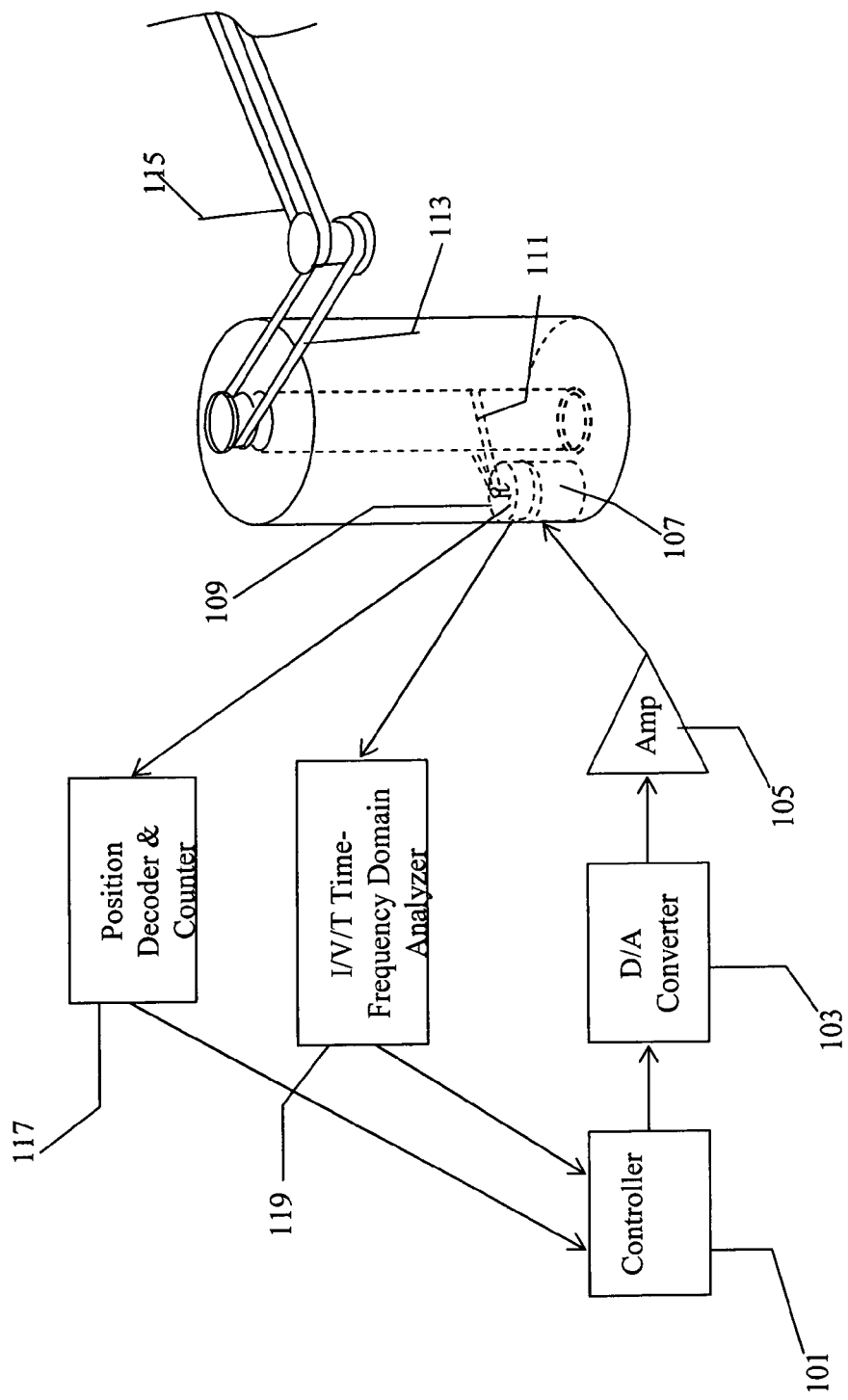
FIG. 1 illustrates a schematic of the servo control with feedback with the addition of continuous monitoring of position, velocity and acceleration time history to frequency domain transform analysis of multiple linkage robot system.

FIG. 1 illustrates a schematic of the servo control and feedback with the addition of continuous monitoring of position, velocity and acceleration time and frequency domain analysis of a servo and associated multiple pulley arm robotic system in the radial dimension.

In an embodiment of the invention, a Controller 101 is serially coupled to a Digital-to-Analog Converter 103 and Amplifier 105 driver, serving to manipulate and control Servo motor 107. The servo 107 is coupled to an Encoder 109, Encoder sensors sending phase shift channel A and B digital data to Position Decoder & Counter 117, and Current/Voltage/Torque signals from servo motor 107 are sent to Time and Frequency Domain analyzer unit 119.

In an embodiment of the invention, the controller 101, D/A converter 103 and amplifier 105 perform typical functions. The servo 107 current, voltage or torque signals are processed by the Time and Frequency Domain analyzer 107 which is provided the pulley ratios which are used to identify the current drawing components and out of limit signal amplitudes.

Pulley_1 drive belt 109 coupled to pulley rotating an adjacent drive belt 111 at a 1:m1 ratio is a known parameter, and installed in the program memory. This is also the case for belt 111 driving another coupled pulley_2 belt 113, where the gear ratio from pulley_1:pulley_2 is also a known parameter, 1:m2. A revolution of the servo will then have an m1×m2 revolution rotation affecting the manipulator end effecter in the radial dimension. Additional servos are likewise coupled to belts and pulleys and used to mechanically extend reach in alternate dimensions. Those servo signals can be processed similarly to provide the full X, Y, and Z or R, T, Z coordinate extensions.

Perturbations caused by manipulator motion will contain frequency and time signatures containing their resonant frequencies. Thus the servo 107 current/voltage/torque signals will contain the identifiable resonant frequencies of each belt, known by their corresponding pulley gear to gear ratio. Signals received and initiated by perturbations on pulley_2 belt 113 will contain the harmonics of the gear ratio multiplier because the high resistance will be encountered by any given component which will draw increased power and hence current from the servo. In translating the moments and forces to the servo, the servo current, voltage or torque sensed will likewise carry the identifiable component belt frequencies. These signals are sent to the Time-Frequency Domain Analyzer 119 unit for signal perturbation origination identification and amplitude magnitude assessment of perturbation against set normal parameters. Fourier transform converts time domain to frequency domain and many signal analysis techniques can be used and are known to those skilled in the art, and are applied to signals received.

Figure 2:
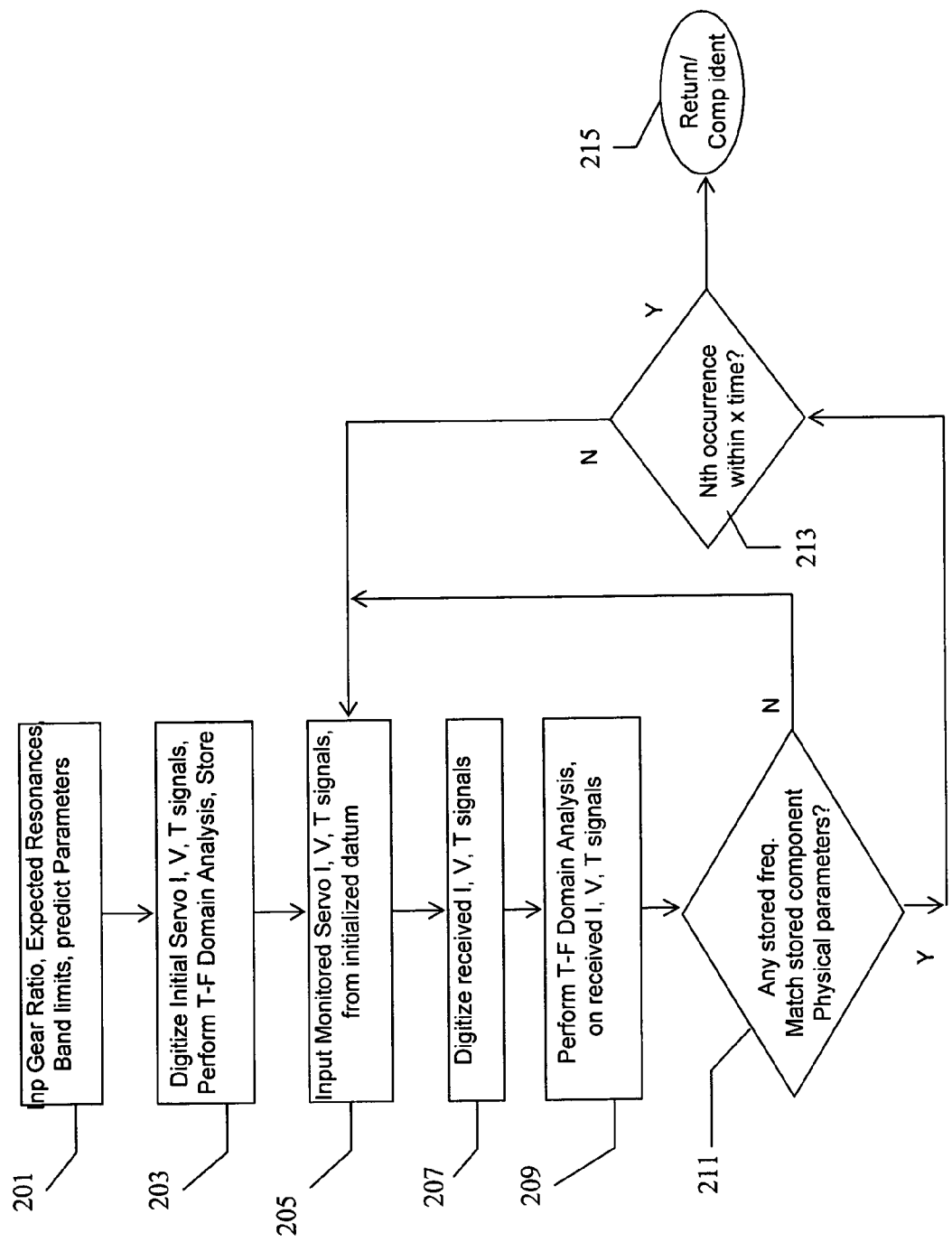
FIG. 2 shows a high level flow chart of the time and frequency domain analysis implementation using known equipment physical characteristics and parameters

FIG. 2 is a high level flow chart of the time-frequency domain analysis implementation using known equipment physical characteristics. Physical parameters, such as gear ratios for coupled pulleys, directly or indirectly transfer power to pulleys, belts and other manipulator components. As such, these components will draw power in accordance with their component power transfer relationships. Their increase in power consumption will be imposed ultimately on the source servo power consumption and hence the power and components and representations of power use, will also exhibit the increase in power drawn, at representative component transfer ratio resonances. The sink components of the power use will transfer their signature through the power transfer relationship. For example, a servo coupled to a pulley gear, will have a gear to gear rotation ratio. The belt driven by the pulley will affect the power drawn by the servo, through the gear coupling and to the ultimate source of the power, the servo. Thus the gear ratio will have a multiplier affect on the power drawn, and will identify the power sink component, pulley or belt, through the frequency or harmonics of the power drawn by the component.

Representatives of characteristic resonance frequencies or harmonics of the robotic manipulator components are stored 201 along with signal amplitude limits for triggering identified component and arm location warnings when power, current, voltage or other sensed signals are outside of preset margins at known resonant frequencies. Initial robotic manipulator characteristics and signal signatures are obtained by digitizing initial servo current, voltage and torque signal, performing time-frequency domain analysis on these signals and storing these data 203. Once initial characteristics and signatures are stored and available, servo monitored signals can be input. The monitored signals are input from a known datum 205, start position and time, similar to the algorithm used for obtaining the initial normal system parameters. These signals are digitized 207 for digital analysis and time-frequency domain analysis reveals any frequency content in the signals 209. The monitored resultant frequency content is compared to the healthy initial system frequency parameters for out-of-band content 211. Any out-of-band content matching known physical natural frequencies or harmonics of system parts such as belts and pulleys will be identified 211 immediately. Reoccurrence of these parametric matches within prescribed periods of time 213 will trigger errors, warnings, or immediate equipment stoppage depending on out-of-band limits exceeded 215.

Figure 3:
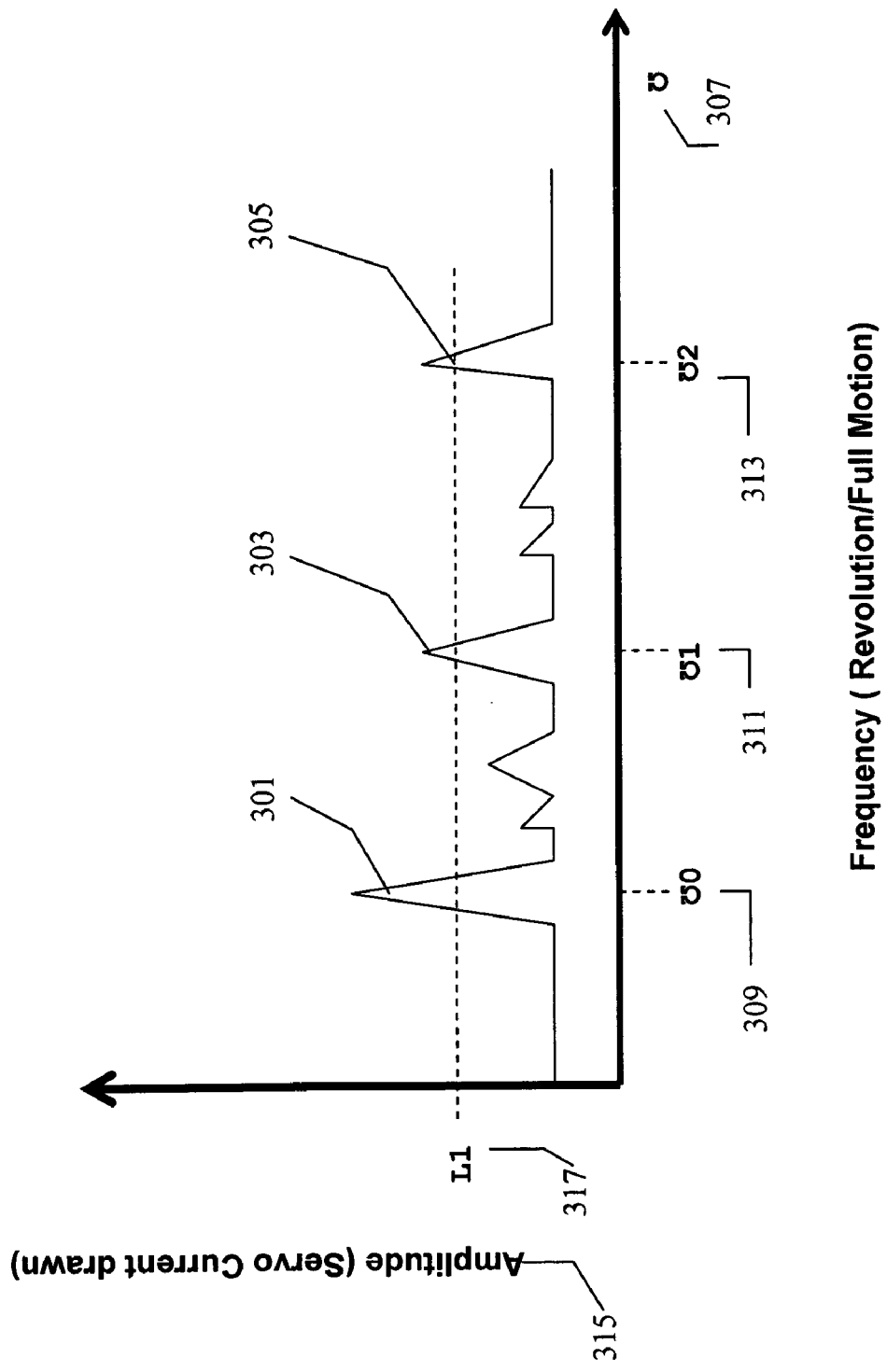
FIG. 3 illustrates a time to frequency domain transform to highlight robot wear components and to identify high friction mechanical linkages.
Figure 4:
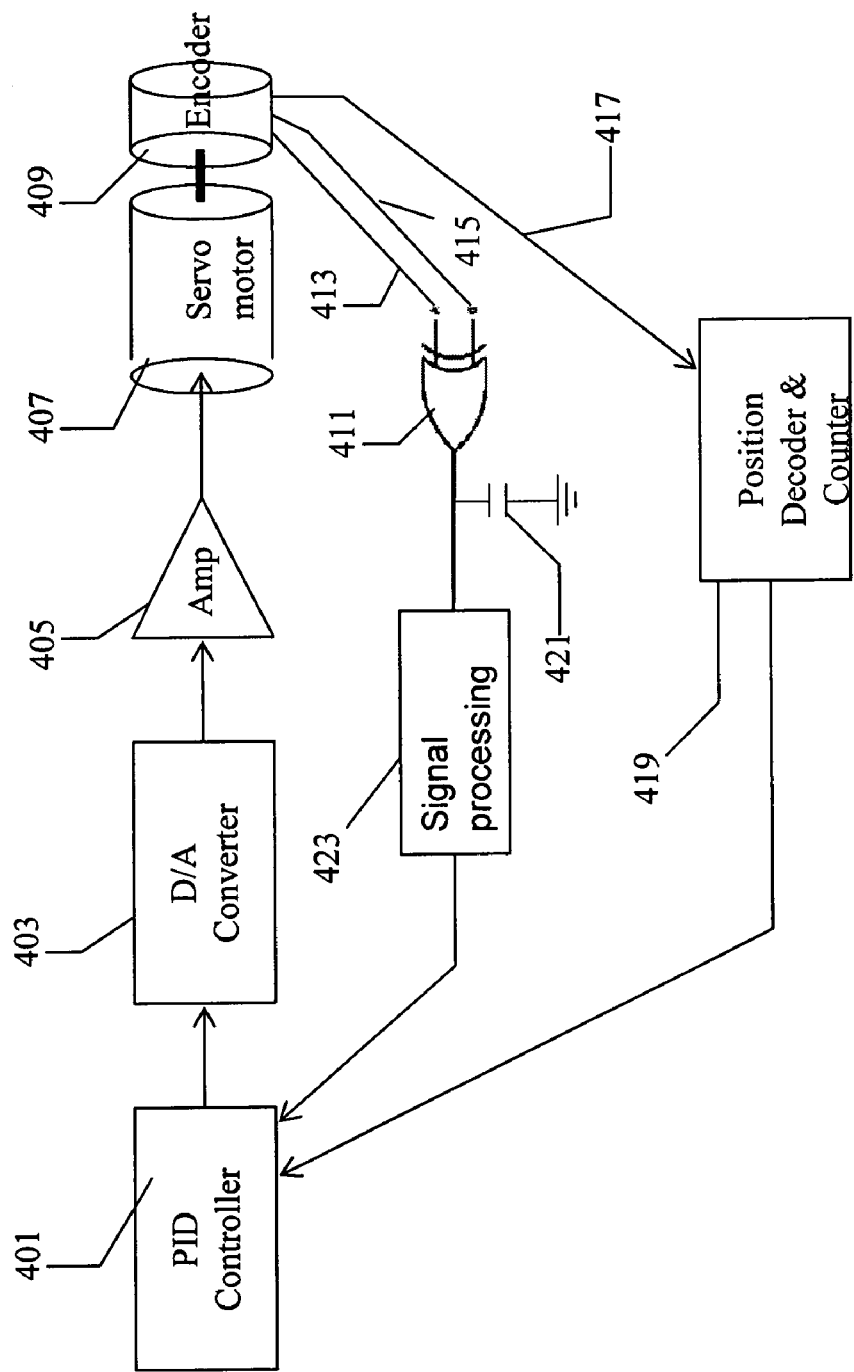
FIG. 4 illustrates a schematic of the servo control with critical phase shift feedback loop in accordance with an embodiment of the invention.

FIG. 3 illustrates a time to frequency domain transform to highlight robot wear and to and identifies high friction mechanical linkages, as they occur. In an embodiment of the invention, the gear ratios between the servo and pulleys in the manipulator are known. Given that the gear ratio in FIG. 1, between the servo 107 and the pulley_1 111 belt, is 1:m1, and the gear ratio from pulley_1 111 belt to pulley_2 113 belt is 1:m2, the resonant frequencies which will transfer to the servo load will be a function of these gear ratios. These parameters are then stored in the analyzer 119. The fundamental resonant frequencies of the individual linkage component servo, pulley_1 and pulley_2 will manifest as peaks at $\Omega 0$ 301, $\Omega 1$ 303, and $\Omega 2$ 305 frequencies 307 plotted verses To capture the motor 407 position, typically a timer interrupt is used to sample the quadrature output from incremental rotary encoder 409 and to update the current position register. Normally, a hardware buffer counter is used for the encoder interface to reduce load of the sampling/reading process. Some servo controls currently sample the input signals directly with only software process to reduce external components.

If the phase shift exceeds the band limits, then this leaves the feedback loop blind, as quadrature counter cannot distinguish rise and fall voltage pulse edges.

Exclusive OR Circuit 411

In an embodiment of the inventions, an Exclusive OR circuit 411 and output phase shift pulse smoothing capacitor 421 provide a method of surviving current position feedback at blind or lost phase angles where the position counter register is unresponsive, $0°±5°$. $180°±5°$. As Channel A and Channel B pulse trains are continuously fed into the Exclusive OR circuit 411, the output across the smoothing capacitor 421 will generally stay at midrange unless the channel A 413 and channel B 415 pulse trains are proximate to $0°$ or $180°$ poles, at which time the voltage will jump to the low range or high range voltage. A low range or high range voltage from signal processing 423 will signal bad quality phase shift angle, at which time the controller 401 will receive bad quality signal although the position decoder/counter 419 has lost count due to steep phase shift angle.

Currently, the encoder can remain faithful where the phase shift angle is not proximate to $0°$ or $180°$. When the phase shift angle is $0°±5°$ or $180°±5°$ then the encoder position tracking is momentarily lost, giving a bad quality feedback. That is because counter circuitry cannot operate near 0 volts or 5 volts, corresponding to $0°$ or $180°$ phase shifts. Therefore when a positioning error occurs during these periods, the response cannot act quickly enough to stop a servo command position from going too far and colliding with a structure.

An embodiment of the invention receives channel A and channel B signals into Exclusive OR circuit, whose output is 2.5 volts at phase shift angles o±90°, and 0 volts or 5 volts when the phase shift angle is to $0°$ or $180°$ respectively. Thus when the feedback loop counter is lost or unable to determine position, near $0°$ or $180°$, the invention embodiment acts to provide a signal which can be used to stop arm movement, averting a costly disaster.

FIG. 5 illustrates a typical time history plot, and FIG. 6 shows the frequency domain transformed from time domain in FIG. 5. The time history plot in FIG. 5 shows the difference between the new and worn servo motors and robot component characteristics in the time domain. FIG. 6 shows worn component identification in accordance with an embodiment of the invention.

Given a time and position of servo performance can be obtained, a time history of a particular servos velocity 501 and Torque 503 verses time 511 is acquired at robot set up. The velocity data 509 provides a basis for comparison on a scheduled real-time basis, to monitor the servo performance over its usage life. Limits or bands 505 507 can be pre-set to trigger if the velocity or torque data strays outside the band. The bands can be multiple, giving indications of robot arm wear or problems well in advance of failures.

As in the time histories, a frequency domain plot with Frequency 523 verses signal amplitude 521 can be processed against preset limits 525 and preset margins triggering warnings when they are exceeded.

Current, voltage, torque, power, velocity profiles can be stored and used to monitor and diagnose potential problems with a robot components. The real-time data can be processed periodically, and resulting trends can also be predictive of cycles or time remaining on all components. Catastrophic failures can be reduced and possibly eliminated.

Therefore, while the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A method for monitoring and diagnosing a robot mechanism comprising the steps of:
storing known power drawing robot arm link characteristic pulley or gear ratios for connected mechanical arm links, to comprise a known set of initial robot arm time and position datum;
mapping the gear ratio to corresponding resonant frequencies of the mechanical link and associated servo;
digitizing and storing servo datum initial data time histories and out-of-limit frequency bands which when exceeded trigger signal perturbation origination identification of mapped gear ratio resonances;
performing a time-frequency domain transform on signal to obtain normal base signal frequency content;
continuously monitoring servo signal for raised pre-set action triggers comprising:
receiving and digitizing known servo signals containing frequency content,
comparing signal frequency content from a time-frequency domain transform on monitored signal,
matching out-of-limit amplitude frequency content to any stored physical component resonant frequencies from gear ratio mappings, and
raising any found matches as identified out of band acting component(s),
whereby mechanical components having resonant frequencies based on power transmission characteristics in the robot components affecting current, voltage, position or torque signal are used for processing signal from matching resonant frequencies to identify link location of mechanical load deviances.

2. The monitoring and diagnosing method of claim 1 further comprising the steps of:
setting limit-band limits on base signal time history signal data or frequency content,
finding out-of-band limit amplitudes or frequencies from comparing stored pre-sets of base signal data, and
raising any found matches in real-time.

3. The monitoring and diagnosing method of claim 1 further comprising the steps of:
receiving at least two servo encoder's position feedback signals into an exclusive OR logic circuit,
obtaining the logic circuit output voltage across a grounded capacitor with charge/discharge characteristic responsive time sufficient for smoothing output signal voltage, and
monitoring capacitor output voltage which signals phase shift angles proximate to 0° and 180°,
whereby encoder signal phase pulses shifted proximate to 0° and 180° angles provide alarm signals allowing timely cessation of mechanical arm movement when the alternate position mechanism is effectively non-functional.

4. The monitoring method as in claim 1 wherein the received servo motor signals are from the set of signals consisting of current, voltage, position and torque.

5. The monitoring method as in claim 1 wherein the out-of-limit levels are pre-set to trigger at levels of advisories, warnings and emergency stops.

6. A method for monitoring and diagnosing a robot mechanism comprising the steps of:
receiving at least two servo encoder's position phase shift channel signals,
inputting the phase shift signals through an exclusive OR logic circuit,
obtaining the logic circuit output voltage across a grounded capacitor with charge/discharge characteristic responsive to the input signal phase pulse train, and
monitoring capacitor output voltage which signals phase shift angles proximate to 0° and 180°,
whereby encoder signal phase pulses shifted to near 0° and 180° phase shift angles will provide alarm signals allowing responsive cessation of mechanical arm movement.

* * * * *